United States Patent Office 3,538,570
Patented Nov. 10, 1970

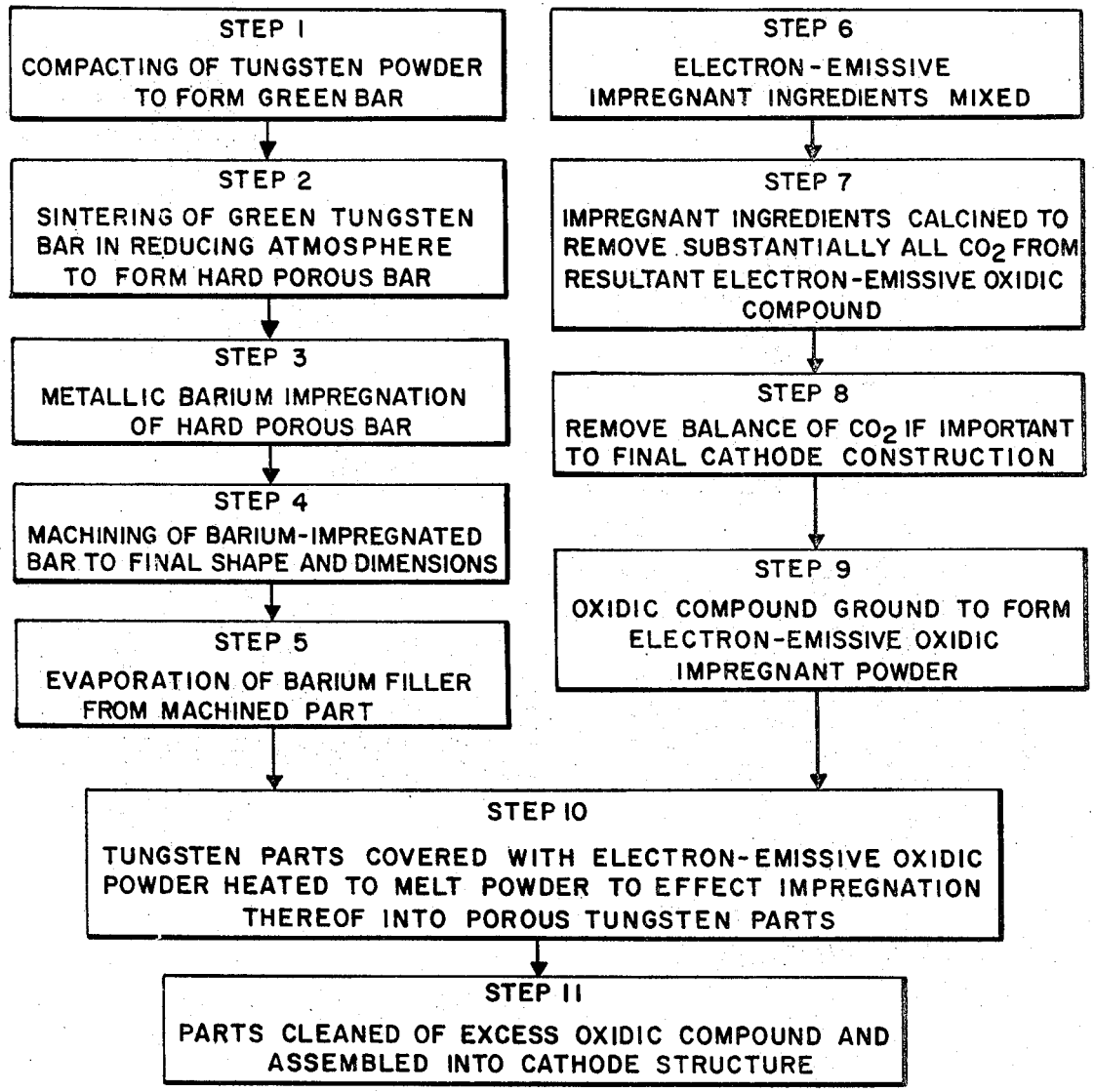

3,538,570
THERMIONIC DISPENSER CATHODE
Otto G. Koppius, Florence, Ky.
(280 Lake Shore Drive, Clermont, Fla. 32711)
Filed Feb. 28, 1968, Ser. No. 709,114
Int. Cl. H01j *9/16, 9/44*
U.S. Cl. 29—25.18            3 Claims

ABSTRACT OF THE DISCLOSURE

A sintered, porous refractory metal matrix which will constitute a thermionic dispenser cathode is impregnated with metallic barium whereby the open pores thereof are completely filled with metallic barium after which the matrix is machined to its final shape and dimensions. The barium metal lubricates, strengthens and reinforces the matrix for the machining operation. The barium filler is then evaporated from the machined part for restoring the initial porous condition of said body as it existed prior to impregnation. The porous part thus formed is then impregnated with electron-emissive oxidic material for providing a thermionic dispenser cathode.

---

This invention relates to a machined, porous refractory matrix and to the method of making same as well as a thermionic dispenser cathode made from said machined matrix and the method of impregnating said machined matrix with an electron emissive oxidic impregnant powder.

Heretofore dispenser cathodes which have been used in microwave tubes such as, by way of example, magnetrons, klystrons, and traveling wave tubes have been made by subjecting tungsten powder to high pressure to form a green matrix which is sintered at high temperatures in a hydrogen furnace to form a rigid hard matrix. According to one described process the pores of the rigid hard matrix are infused with molten copper. The sintered infused mass is then machined to the desired shape of a cathode and after which it is vacuum fired to remove the copper from the machined part.

In another described process the pores of the rigid, hard matrix is filled with a plastic monomer which is allowed to polymerize into a hard mass after which it is machined to the required shape of the cathode. The plastic is then removed from the machined part by a vacuum firing.

I have found that there are serious objections to both of the above described methods of fabricating cathodes from an impregnated, porous, tungsten matrix. In both methods a foreign material is introduced into the porous tungsten matrix for machining purposes, and in both cases, the foreign material must be completely removed from the structure before a suitable electron emissive substance can be introduced. I have found that the emission quality of the dispenser cathodes of the above described prior art types are dependent in a large measure on effective and complete removal of the filler material from the porous metal matrix. In actual practice, however, complete removal of the filler is never possible and as a consequence the emission characteristics of such cathodes are erratic. While such processes result in a satisfactory dispenser cathode if all of the foreign filler material has been removed, cathodes so made are extremely expensive since there is no assurance that all of the filler material has been removed without conducting elaborate, time consuming and expensive tests.

An object of the present invention is to provide a porous tungsten matrix which is impregnated with metallic barium as the infiltrating material for lubricating, strengthening and reinforcing the matrix for machining to the final size and dimensions of a cathode structure. The emissive action of the subject thermionic cathode is not dependent upon the complete removal of the barium from the pores of the tungsten matrix since barium and its oxide form the principal constituent of the emissive agent with which the porous machined part is later impregnated.

In other words, no foreign material is introduced into the porous tungsten matrix by my process. Consequently, no elaborate tests are required to determine what amount of barium, if any, remains in the machined part after the barium has been evaporated from the matrix. Hence, uniformly acceptable cathodes are produced at great cost savings.

With reference now to FIG. 1, it will be noted that the first step in my invention calls for the formation of a green tungsten bar by conventional metallurgical methods; that is a quantity of tungsten powder is pressed at about 20,000 pounds per square inch into a "green" bar-shaped body which is then sintered for example as disclosed in U.S. Pat. 2,669,008 to provide a hard porous tungsten bar (step 2).

As step 3, I impregnate the porous tungsten bar with molten metallic barium. This may be effected with comparative ease since barium readily wets tungsten and all of the other refractory metals include a molybdenum, tungsten molybdenum alloys, tantalum and columbium. Barium melts at 750° C, and boils at 1140° C. under one atmosphere pressure and it is completely inert under Argon gas.

To impregnate the porous tungsten bar of step 2 a quantity of metallic barium is melted in a non-reducing atmosphere of argon to a temperature preferably 150° or more above the melting point of barium. The hard porous bar of tungsten is heated to a temperature in excess of the temperature of the molten barium after which it is dipped or inserted into the molten barium. Complete infiltration of barium occurs in a manner of minutes by capillary attraction. The porous tungsten bar thus infiltrated with barium occurs in a manner of minutes by capillary atmosphere except for slight surface oxidation.

After the barium impregnated porous bar has been cooled, it is then machined, step 4, to the final shape and dimension of a cathode.

After machining the barium is removed from the machined part, step 5, by evaporation and under normal circumstances all or substantially all of the barium will be removed from the body by heating it in a vacuum furnace to a relatively low temperature, for example 900–1200° C. for about twenty minutes followed by an increase in temperature to 1500° for 5 minutes. As a result of this treatment the initial porous condition of said body will be restored to the condition as it existed prior to being impregnated with the barium metal. The vapor pressure of barium at 1000° C. is about 100,000 times that of copper and thus it is easily evaporated from the machined porous tungsten parts.

Steps 6, 7, 8 and 9 of FIG. 1 which relate to the preparation of an electron-emissive oxidic impregnant powder for the machined part of step 5 will have already been completed.

As step 6 I prepare a mixture constituting 4–4½ moles of barium oxide, ½ to ¾ moles of strontium oxide, 1 to 1½ moles of calcium oxide, ¼ to ½ moles of yttrium oxide and ½ to ¾ moles of aluminum oxide. These ingredients are thoroughly mixed and then calcined, step 7, at temperatures sufficient to remove at least 95% of the carbon dioxide while the ingredients react with one another to form a barium-strontium-calcium-yttrium-aluminate oxidic compound. Uniformly satisfactory results have been obtained when the mixture of step 6 is calcined on a silica tray at temperatures of 1125° C. for 30–36 hours.

In those instances in which the presence of less than 5% $CO_2$ is unimportant to the final cathode construction calcined oxidic compound of step 7 is thoroughly ground, step 9, to form an electron-emissive oxidic impregnant powder.

In those instances in which the presence of $CO_2$ would create a problem in the final cathode construction the calcined compound of step 7 is subjected to a further calcining action for removing all of the $CO_2$ therefrom, step 8, by heating to 1350° C. for ½ hour in hydrogen or in cracked ammonia. The resultant compound is then ground to a powder as per step 9.

The porous, machined tungsten parts of step 5 are covered with a quantity of electron-emissive oxidic powder and the parts and powder heated sufficiently to melt the powder whereby it will be completely impregnated by capillary action into the pores of the tungsten part, step 10.

Uniformly satisfactory results are obtained in those instances in which the heat applied in step 10 is approximately 100° C. above the melting point of the impregnant powder, that is to a temperature of 1600° C.±20° C. After the powder melts impregnation will be complete in from 15 to 90 seconds.

After impregnation occurs the electron-emissive impregnated part of step 10 is cooled. Any excess oxidic compound is removed and the resultant, now impregnated part is ready to be mounted as a cathode, step 11, in a glass diode tube and activated by heating to 1250° C. for a few minutes in a vacuum.

Operation of the cathode at 1200° C. results in extremely high emission densities over a life of more than 1500 hours. In this instance it is essential to hold the density of the tungsten between 78 and 84% of theoretical density.

FIG. 2 constitutes a table indicating the consistency of the weight gain by uniform standard porous tungsten discs having a theoretical density of 80% when impregnated with the emissive material described by the prior art with the emissive material impregnated according to my process. The tabulation is predicated on the result of testing several hundred discs. It should be emphasized that those porous tungsten discs which have a low percentage of theoretical pick-up, 85% and below, will show erratic electron emission, are difficult to activate, and will have a poor life history. Such items are classified as rejects and it is important that they be detected and eliminated by some test procedure before being released for commercial use. The three different prior art impregnant mixtures viz.:

(1) 5 moles barium carbonate and 2 moles aluminum oxide;
(2) 5 moles barium carbonate, 3 moles calcium carbonate and 2 moles aluminum oxide; and
(3) 4 moles barium carbonate, 1 mole calcium carbonate and 1 mole aluminum oxide, each show essentially the same deviation wherein those constituting the 5 to 2 mole mixtures, that is 5 moles of barium oxide and 2 moles of aluminum oxide, were the least desirable.

The superior uniformity of impregnation of the porous tungsten by the new impregnant is an essential part of the invention since by its use, one need not test for the completion of impregnation and thereby great cost savings can be effected.

It should be understood that various changes and modifications may be made within the scope of the appended claims without departing from the spirit of my invention.

What I claim is:
1. The method of making a dispenser type cathode which comprises the steps of:
   (1) forming a sintered porous body of tungsten,
   (2) impregnating, in a non-reactive atmosphere, said porous body with barium metal by immersing said body in molten barium while at a temperature at least as great as the temperature of the molten barium,
   (3) cooling said barium impregnated body in a non-reactive atmosphere,
   (4) machining said body to its final shape and dimensions,
   (5) heating said machined barium-impregnated body in a non-reactive atmosphere to a temperature in excess of the temperature at which the barium was impregnated for evaporating at least a major portion but not all of the barium from said porous body,
   (6) impregnating said porous body member with an electron emissive barium containing compound by heating said body and compound in direct contact in a non-reactive atmosphere to melt the compound, and then
   (7) cooling said impegnated body in a non-reactive atmosphere.

2. The method of claim 1, wherein the emissive compound includes yttrium.

3. The method of claim 1, wherein the electron emissive comprises:

4 to 4½ moles of barium carbonate ($BACO_3$)
½ to ¾ moles of strontium carbonate ($SrCo_3$)
1 to 1¼ moles of calcium carbonate ($CoCo_3$)
¼ to ½ moles of yttrium oxide ($Y_2O_3$)
½ to ¾ moles of aluminum oxide ($Al_2O_3$), calcined to remove substantially all $CO_2$ therefrom to form a barium-strontium-calcium-yttrium-aluminate oxidic compound.

References Cited
UNITED STATES PATENTS

| | | | |
|---|---|---|---|
| 2,700,000 | 1/1955 | Levi et al. | 29—25.18 |
| 2,721,372 | 10/1955 | Levi | 29—25.18 |
| 2,813,807 | 11/1957 | Levi | 313—346 |
| 3,076,916 | 2/1963 | Koppius | 29—25.18 XR |
| 3,118,080 | 1/1964 | Koppius | 29—25.18 XR |

JOHN F. CAMPBELL, Primary Examiner

R. B. LAZARUS, Assistant Examiner

U.S. Cl. X.R.

29—25.17